United States Patent
Lu

(10) Patent No.: US 11,627,357 B2
(45) Date of Patent: Apr. 11, 2023

(54) METHOD FOR PLAYING A PLURALITY OF VIDEOS, STORAGE MEDIUM AND COMPUTER DEVICE

(71) Applicant: BIGO TECHNOLOGY PTE. LTD., Singapore (SG)

(72) Inventor: Kai Lu, Guangzhou (CN)

(73) Assignee: BIGO TECHNOLOGY PTE. LTD., Singapore (SG)

(*) Notice: Subject to any disclaimer, the term of this patent is extended or adjusted under 35 U.S.C. 154(b) by 0 days.

(21) Appl. No.: 17/299,184

(22) PCT Filed: Oct. 28, 2019

(86) PCT No.: PCT/CN2019/113600
§ 371 (c)(1),
(2) Date: Jun. 2, 2021

(87) PCT Pub. No.: WO2020/114146
PCT Pub. Date: Jun. 11, 2020

(65) Prior Publication Data
US 2022/0078500 A1    Mar. 10, 2022

(30) Foreign Application Priority Data
Dec. 7, 2018    (CN) .......................... 201811497837.6

(51) Int. Cl.
*H04N 21/262*    (2011.01)
*H04N 21/2387*    (2011.01)

(52) U.S. Cl.
CPC ... *H04N 21/26258* (2013.01); *H04N 21/2387* (2013.01)

(58) Field of Classification Search
None
See application file for complete search history.

(56) References Cited

U.S. PATENT DOCUMENTS

| 7,313,808 B1* | 12/2007 | Gupta | .................. G11B 27/034 348/E7.061 |
| 8,229,287 B1* | 7/2012 | Duggal | .................. H04N 5/76 386/344 |

(Continued)

FOREIGN PATENT DOCUMENTS

| CN | 103616991 A | 3/2014 |
| CN | 104219376 A | 12/2014 |

(Continued)

OTHER PUBLICATIONS

International Search Report of the International Searching Authority for State Intellectual Property Office of the People's Republic of China in PCT application No. PCT/CN2019/113600 dated Jan. 17, 2020, which is an International application corresponding to this U.S. application.

(Continued)

*Primary Examiner* — An Son P Huynh
(74) *Attorney, Agent, or Firm* — Kolitch Romano Dascenzo Gates LLC

(57) ABSTRACT

Provided is a method for playing a plurality of videos, including: creating a sliding window with a preset length according to a first to-be-played video in the plurality of videos, wherein the sliding window comprises the first to-be-played video and a preset number of second to-be-played videos; preloading each video in the sliding window by each of video players; preloading the first to-be-played video by one of the video players and playing the first to-be-played video as a currently playing video, wherein the second to-be-played videos are preloaded by other video players; and playing one of the second to-be-played videos by calling a video player interface corresponding to the second to-be-played video in the sliding window in response (Continued)

to the currently playing video being switched to the second to-be-played video.

15 Claims, 4 Drawing Sheets

(56) References Cited

U.S. PATENT DOCUMENTS

| | | | | |
|---|---|---|---|---|
| 8,787,618 | B2* | 7/2014 | Tokutake | G11B 27/28 382/103 |
| 8,799,950 | B2* | 8/2014 | Park | H04N 21/84 725/43 |
| 10,021,464 | B2 | 7/2018 | Todorovic et al. | |
| 10,049,379 | B2* | 8/2018 | Zazza | G06Q 30/02 |
| 10,095,787 | B2* | 10/2018 | Kang | H04N 21/47 |
| 10,575,043 | B2* | 2/2020 | Da Fonseca | H04N 21/4316 |
| 10,579,211 | B2* | 3/2020 | Sang | G06F 3/04817 |
| 10,856,049 | B2* | 12/2020 | Bloch | H04N 21/4758 |
| 2002/0174430 | A1* | 11/2002 | Ellis | H04N 21/47 725/46 |
| 2004/0019608 | A1* | 1/2004 | Obrador | G06F 16/489 |
| 2004/0187160 | A1* | 9/2004 | Cook | H04N 7/17336 725/94 |
| 2007/0157281 | A1* | 7/2007 | Ellis | H04N 7/17309 725/134 |
| 2008/0066136 | A1 | 3/2008 | Dorai et al. | |
| 2009/0158214 | A1* | 6/2009 | Arnold | G06F 16/44 715/830 |
| 2009/0158326 | A1* | 6/2009 | Hunt | G06F 16/745 725/38 |
| 2009/0178089 | A1* | 7/2009 | Picco | H04N 7/17336 725/87 |
| 2011/0078717 | A1* | 3/2011 | Drummond | H04N 21/4788 725/14 |
| 2011/0131622 | A1 | 6/2011 | Wu et al. | |
| 2011/0246621 | A1* | 10/2011 | May, Jr. | G06F 16/4387 709/219 |
| 2011/0307781 | A1* | 12/2011 | Sood | G06F 3/0484 715/716 |
| 2012/0047119 | A1* | 2/2012 | Kandekar | G06F 16/748 707/705 |
| 2012/0047542 | A1* | 2/2012 | Lewis | H04N 21/812 725/97 |
| 2013/0071095 | A1* | 3/2013 | Chauvier | H04N 21/47217 386/343 |
| 2013/0332971 | A1* | 12/2013 | Fisher | H04N 21/26258 725/93 |
| 2013/0347047 | A1* | 12/2013 | Tanaka | H04N 21/8456 725/110 |
| 2014/0129618 | A1* | 5/2014 | Panje | H04N 21/26258 709/203 |
| 2014/0281010 | A1* | 9/2014 | Panje | H04L 65/80 709/231 |
| 2014/0282262 | A1* | 9/2014 | Gregotski | H04N 21/8549 715/838 |
| 2014/0368734 | A1 | 12/2014 | Hoffert et al. | |
| 2015/0293675 | A1* | 10/2015 | Bloch | G11B 27/34 715/723 |
| 2015/0325268 | A1* | 11/2015 | Berger | H04N 21/44204 386/248 |
| 2016/0094875 | A1* | 3/2016 | Peterson | H04N 21/47217 725/41 |
| 2016/0227258 | A1* | 8/2016 | Zhang | H04L 65/605 |
| 2016/0345074 | A1* | 11/2016 | Serbest | H04L 67/306 |
| 2017/0164069 | A1* | 6/2017 | Oh | H04L 65/4092 |
| 2017/0257674 | A1* | 9/2017 | Horita | H04N 21/4147 |
| 2017/0289639 | A1* | 10/2017 | Reisner | H04L 67/06 |
| 2018/0255362 | A1* | 9/2018 | Chittella | H04N 21/6587 |
| 2019/0166412 | A1* | 5/2019 | Panchaksharaiah | G06F 16/447 |

FOREIGN PATENT DOCUMENTS

| | | |
|---|---|---|
| CN | 105451079 A | 3/2016 |
| CN | 105898528 A | 8/2016 |
| CN | 105898625 A | 8/2016 |
| CN | 107071549 A | 8/2017 |
| CN | 109688473 A | 4/2019 |

OTHER PUBLICATIONS

The State Intellectual Property Office of People's Republic of China, First Office Action in Patent Application No. 201811497837.6 dated Mar. 25, 2020, which is a foreign counterpart application corresponding to this U.S. Patent Application, to which this application claims priority.

Notification to Grant Patent Right for Invention of Chinese Application No. 201811497837.6 dated Nov. 30, 2020, to which this application claims priority.

Huang, Yigui; et al., "Research of Self-Adjust Size of Sliding Window Model in P2P-Based VoD System", Computer Technology and Development, vol. 20, No. 5; May 31, 2010.

Liu, Qiangwei; "P4P-Based System for Streaming Media On-Demand Research and Implementation", China Master's Theses Full-text Database, No. 07; Jul. 15, 2012.

* cited by examiner

METHOD FOR PLAYING A PLURALITY OF VIDEOS, STORAGE MEDIUM AND COMPUTER DEVICE

This application is a US national stage of international application No. PCT/CN2019/113600, filed on Oct. 28, 2019, which claims priority to the Chinese Patent Application No. 201811497837.6, filed on Dec. 7, 2018 and entitled "MULTI-VIDEO PLAYING METHOD, STORAGE MEDIUM, AND COMPUTER DEVICE". Both applications are herein incorporated by reference in their entireties.

TECHNICAL FIELD

The present disclosure relates to the field of video data processing technologies, in particular relates to a method for playing a plurality of videos, a storage medium and a computer device.

BACKGROUND

When a photographer uploads a video to a short-video application (App), it is necessary to edit the video to make the storyline described by the video richer and more vivid or more interesting. Preview of the plurality of edited videos requires seamless playing of the plurality of videos.

SUMMARY

According to embodiments of the present disclosure, a method for playing a plurality of videos, a storage medium and a computer device are provided to solve the problems of poor flexibility and poor expandability in playing of the plurality of videos. The technical solutions are described as below.

According to an aspect, a method for playing a plurality of videos is provided. The method includes: creating a sliding window with a preset length according to a first to-be-played video in the plurality of videos, wherein the sliding window includes the first to-be-played video and a preset number of second to-be-played videos; preloading each video in the sliding window by each of video players; preloading the first to-be-played video by one of the video players and playing the first to-be-played video as a currently playing video, wherein the second to-be-played videos are preloaded by other video players; and playing one of the second to-be-played videos by calling a video player interface corresponding to the second to-be-played video in the sliding window in response to the currently playing video being switched to the second to-be-played video, wherein the sliding window moves as the currently playing video progresses, so as to position a next video in the sliding window and preload the next video as a new second to-be-played video.

In some embodiments, prior to preloading each video in the sliding window by each of the video players, the method further includes: acquiring a preset number of video players according to a number of videos in the sliding window; and configuring a player pool according to the preset number of video players; and preloading each video in the sliding window by each of the video players includes: acquiring the video players from the player pool, and preloading each video in the sliding window by each of the video players.

In some embodiments, upon playing the first to-be-played video as the currently playing video, the method further includes: controlling the sliding window to move as the currently playing video progresses; and in response to the currently playing video moving out of the sliding window, releasing a video player associated with the moved-out video and adding the video player associated with the moved-out video in the player pool.

In some embodiments, upon controlling the sliding window to move as the currently playing video progresses, the method further includes: preloading a third to-be-played video in the moved sliding window by the video player.

In some embodiments, preloading the third to-be-played video in the moved sliding window by the video player includes: preloading the third to-be-played video to a designated position by a video player.

In some embodiments, the sliding window includes a currently playing video, a played video and an unplayed video; and playing one of the second to-be-played videos by calling a video player interface corresponding to the second to-be-played video in the sliding window in response to the currently playing video being switched to the second to-be-played video includes: playing the played video as the second to-be-played video by calling a video player interface corresponding to the played video in response to a trigger operation of switching to playing the played video; and playing the unplayed video as the second to-be-played video by calling a video player interface corresponding to the unplayed video in response to a trigger operation of switching to playing the unplayed video.

In some embodiments, calling the video player interface corresponding to the second to-be-played video in the sliding window in response to the currently playing video being switched to the second to-be-played video includes: calling the video player interface corresponding to the second to-be-played video in the sliding window and switching a screen of a video player corresponding to the second to-be-played video for display in response to the currently playing video being switched to the second to-be-played video.

In some embodiments, upon playing the first to-be-played video as the currently playing video, the method further includes: modifying the sliding window according to playing of the currently playing video; or modifying the sliding window in response to receiving a drag-to-play operation or an operation of triggering a playing progress bar to skip.

According to another aspect, a storage medium storing a computer program therein is provided. The computer program, when run by a processor, causes the processor to perform the method for playing the plurality of videos as defined in any of the embodiments described above.

According to yet another aspect, a computer device is provided. The computer device includes at least one processor, a memory and at least one application. The at least one application is stored in the memory, wherein the at least one application, when run by the at least one processor, causes the at least one processor to perform the method for playing the plurality of videos as defined in any of the embodiments described above.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

Figure 1:
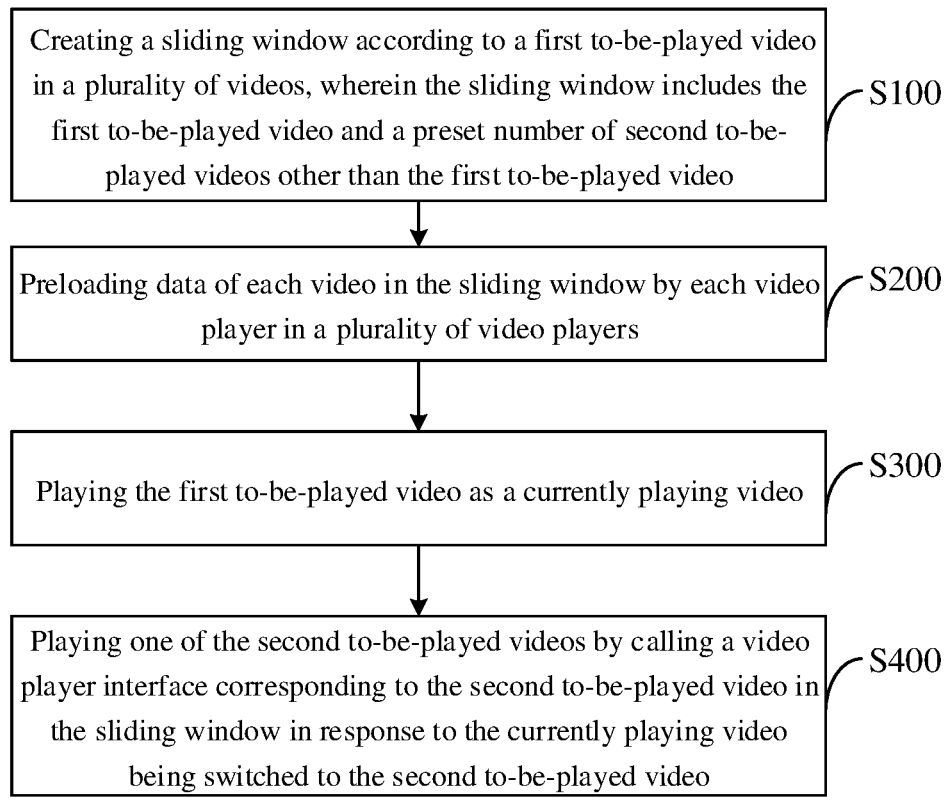
FIG. 1 is a flowchart showing a method for playing a plurality of videos according to an exemplary embodiment of the present disclosure.

For clearer descriptions of the objectives, technical solutions and advantages of the present disclosure, embodiments of the present disclosure are described in detail hereinafter with reference to the accompanying drawings.

Seamless playing refers to the following video playing: one video is coherently switched from one video to the next video within an extremely short period of time while a user almost does not feel the switching between the two videos.

Video editing refers to the following: video sources are cut and merged to generate new videos with different expressiveness through secondary encoding.

In conventional technical solutions, there are two typical solutions for seamless playing of the plurality of videos, provided in an IOS platform.

(1) One solution is realized by AVQueuePlayer, that is, the plurality of videos are played continuously via −[AVQueuePlayer initWithItems:] or +[AVQueuePlayer queuePlayerWithItems:]. However, the obvious disadvantage of the solution is that a significant black frame appears after each video segment has been played, which results in poor continuity, thereby having a certain gap with the expected effect.

(2) Another solution is realized by AVMutableComposition, that is, the plurality of videos are merged into one AVComposition for playing. However, the solution is limited to usage scenarios and is only applicable to videos of the same format. When the videos are encoded by different modes, the videos that are encoded different from a first video cannot be played. Therefore, secondary encoding is required to unify the encoding modes of the videos, which cannot meet the requirement for fast seamless playing in a short-video editing mode.

These two solutions mentioned above are poor in flexibility, and cannot realize convenient adaptation during preview of some basic editing effects, e.g., cutting, rotating, muting, and unifying of video drawing sizes, which can result in poor expandability.

The present disclosure provides a method for playing a plurality of videos, which is applicable to seamlessly play the plurality of videos spliced after the plurality of videos are edited. An explanation is first made to provide background of the method for playing the plurality of videos in the present disclosure.

In the present disclosure, a plurality of video players is adopted to preload and play a plurality of videos. The video player may be an AVPlayer. In this case, a video model is taken as a carrier, a sliding window with a fixed length is created, and the videos in the sliding window are preloaded into the AVplayer and played at appropriate time, so as to achieve the objective of seamless playing of the plurality of videos. The AVPlayer is often adopted to play a single video, and may also be adopted to play the plurality of videos by modifying AVPlayerItems relevant to the AVPlayer. However, due to the delay of video loading, seamless playing cannot be achieved during switching of the videos. To solve this problem, the plurality of AVPlayers are adopted to preload other to-be-played videos while a current video is played. In this way, the video that finishes playing is immediately switched to the next video for playing and displaying, thereby realizing a seamless switching effect. Compared with an existing solution of a system, the present solution has a relatively complicated control logic, but is still implemented based on an application programming interface (API) of the system, occupies less resources of the system, has higher playing efficiency, and can support all IOS video equipment on the market at present. In the design, in order to ensure the flexibility of the player, a play control logic is decoupled from a video list management logic, a video playlist can be carried while playing is carried out, and all video models are independent of one another. The playing can be controlled conveniently by modifying the video model to support video editing and playing. The implementation method is flexible and the expansion is easy.

In an embodiment, as shown in FIG. 1, a method for playing a plurality of videos includes the following steps.

In S100, a sliding window is created according to a first to-be-played video in the plurality of videos, and the sliding window includes the first to-be-played video and a preset number of second to-be-played videos other than the first to-be-played video.

In this embodiment, a playing system includes a plurality of to-be-played videos. The plurality of videos may be videos edited for splicing and playing. During initialization of the playing system, a playing window is created by taking a to-be-played video as the first to-be-played video, and the sliding window is created according to the first to-be-played video. The sliding window may include the first to-be-played video and the preset number of second to-be-played videos. The length of the sliding window is created mainly in considering the following cases: one is that the next video needs to be played seamlessly when the plurality of videos is continuously played, and the other is that when a user drags a playing progress bar, it is possible to return from a currently playing video to a previous video. Therefore, the sliding window may include at least three to-be-played videos.

In S200, data of each video in the sliding window is preloaded by each video player in a plurality of video players.

In this embodiment, the playing system acquires a plurality of video players to preload each video in the sliding window, and the number of the acquired video players may be equal to that of the videos in the sliding window.

In an exemplary embodiment, the playing system may load and play the first to-be-played video by one of the acquired video players, and preload a preset number of second to-be-played videos that are not currently played in the sliding window by the acquired other video players. The video may be preloaded to a designated position of the corresponding video, or may be directly preloaded all the data of the corresponding video. It should be noted that in this embodiment, the preloading to the designated position may reduce pressure of the playing system.

In an exemplary embodiment, the video player is an AVPlayer, and the playing system acquires a plurality of AVplayers, and preloads each video in the sliding window by using each acquired AVplayer. Specifically, the playing system loads and plays the first to-be-played video by the AVPlayer, and simultaneously preloads the preset number of second to-be-played videos that are not currently played in the sliding window by other AVPlayers. The preset number of second to-be-played videos that are not currently played are preloaded in the way that they are preloaded to designated positions of the corresponding videos, or all the data of the corresponding videos is directly preloaded.

In S300, the first to-be-played video is played, and the first to-be-played video is taken as a currently playing video.

In this embodiment, the playing system takes the first to-be-played video as the currently playing video and plays it through the playing window. In the whole playing process of the plurality of videos, the currently playing video is switched for playing according to playing conditions, i.e., a video that is being played is taken as the currently playing video. For example, when the currently playing video is finished, the playing system directly switches to the next preloaded to-be-played video, i.e., directly switches to the second to-be-played video, and plays the second to-be-played video through the playing window, and the second to-be-played video is taken as the currently playing video. When the playing system receives a drag-to-play operation from the user, the currently playing video is switched according to the drag-to-play operation from the user. When the playing system receives an operation from a user for triggering a playing progress bar to skip, the currently playing video is switched according to the operation of triggering the playing progress bar to skip. In addition, when the playing time or the playing content of the currently playing video changes, the sliding window is modified with the currently playing video as a center. The operation of triggering the playing progress bar to skip is an operation that the user clicks the playing progress bar to skip.

In some embodiments, after step S300, the method further includes: modifying the sliding window according to the playing conditions of the currently playing video; or, modifying the sliding window in response to receiving the drag-to-play operation or the operation of triggering the playing progress bar to skip. That is, in this embodiment, when the playing system plays the video normally, plays by dragging or plays by clicking the playing progress bar to skip, the sliding window may be modified with the currently playing video as the center.

It should be noted that modifying the sliding window with the currently playing video as the center may refer to always modifying the sliding window with reference to the position of the currently playing video in the sliding window.

In S400, one of the second to-be-played videos is played by calling a video player interface corresponding to the second to-be-played video in the sliding window in response to the currently playing video being switched to the second to-be-played video.

In this embodiment, the playing system plays the currently playing video through the playing window. If it is detected that the currently playing video is switched for playing, a video player interface corresponding to the next to-be-played video is called, and the next video is played through triggering by the video player interface. It should be noted that when the currently playing video is switched to the second to-be-played, the sliding window may move according to the currently playing video to ensure that the next to-be-played video is disposed in the sliding window.

When a video that is switched to is the second to-be-played video in the sliding window, i.e., the next video to which the currently playing video is to be switched for playing in the playing window is the second to-be-played video, the video player interface corresponding to the second to-be-played video that is switched to in the sliding window is called, and the second to-be-played video that is switched to is played.

The video may be switched for playing in the following ways: when the system automatically skips to the second to-be-played video that is switched to after the playing of the currently playing video is finished, the video player interface of the second to-be-played video that is switched to may be called, and the second to-be-played video is played through the video player interface; or, when the playing system performs playing skip in response to receive the operation of triggering the playing progress bar to skip from the user, the video player interface of the second to-be-played video that is switched to may be acquired according to the operation of triggering the playing progress bar from the user, and the second to-be-played video is played through the video player interface; or, when the playing system receives the drag-to-play operation from the user, the video player interface of the second to-be-played video that is switched to is acquired according to the drag-to-play operation from the user, and the second to-be-played video is played through the video player interface. In addition, it should be noted that the second to-be-played video may be a video that has already been played, or any video that has not been played after the currently playing video in a playlist.

In some embodiments, step S400 includes: calling the video player interface corresponding to the second to-be-played video in the sliding window and switching a screen of a video player corresponding to the second to-be-played video for display in response to the currently playing video being switched to the second to-be-played video.

In an exemplary embodiment, when it is necessary to switch the currently playing video, a screen (CAPlayerLayer) of the AVPlayer corresponding to the preloaded second to-be-played video in the sliding window is switched, thereby achieving seamless switching of the videos. Further, other videos in the sliding window are preloaded while the second to-be-played video is started.

In the method for playing the plurality of videos in the above embodiment, the sliding window is created according to the first to-be-played video in the plurality of videos, and the sliding window includes the preset number of second to-be-played videos in addition to the first to-be-played video. According to the method, the first to-be-played video is played as the currently playing video, and the plurality of video players is adopted to preload the currently playing video and the preset number of second to-be-played videos. When the currently playing video is finished and is immediately switched to the next video for playing and displaying, the video player interface corresponding to the second to-be-played video that is switched to in the sliding window is called, and then the second to-be-played video that is switched to is played, realizing seamless switching between the plurality of videos that are switched for playing. Therefore, splicing preview of the plurality of videos can be realized in real time without secondary encoding of the videos and without adaptive configuration for the video, and the expandability is better.

Figure 2:
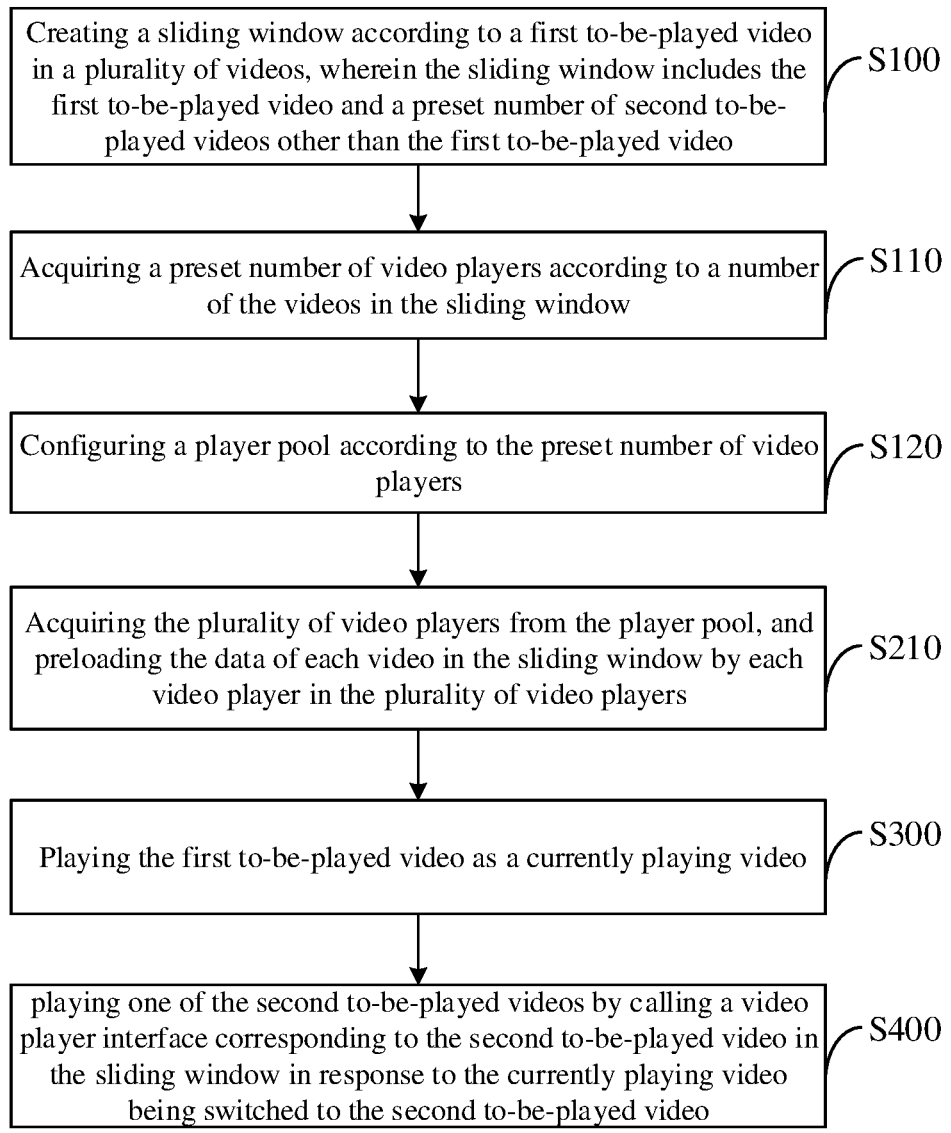
FIG. 2 is a flowchart showing another method for playing a plurality of videos according to an exemplary embodiment of the present disclosure.
Figure 3:
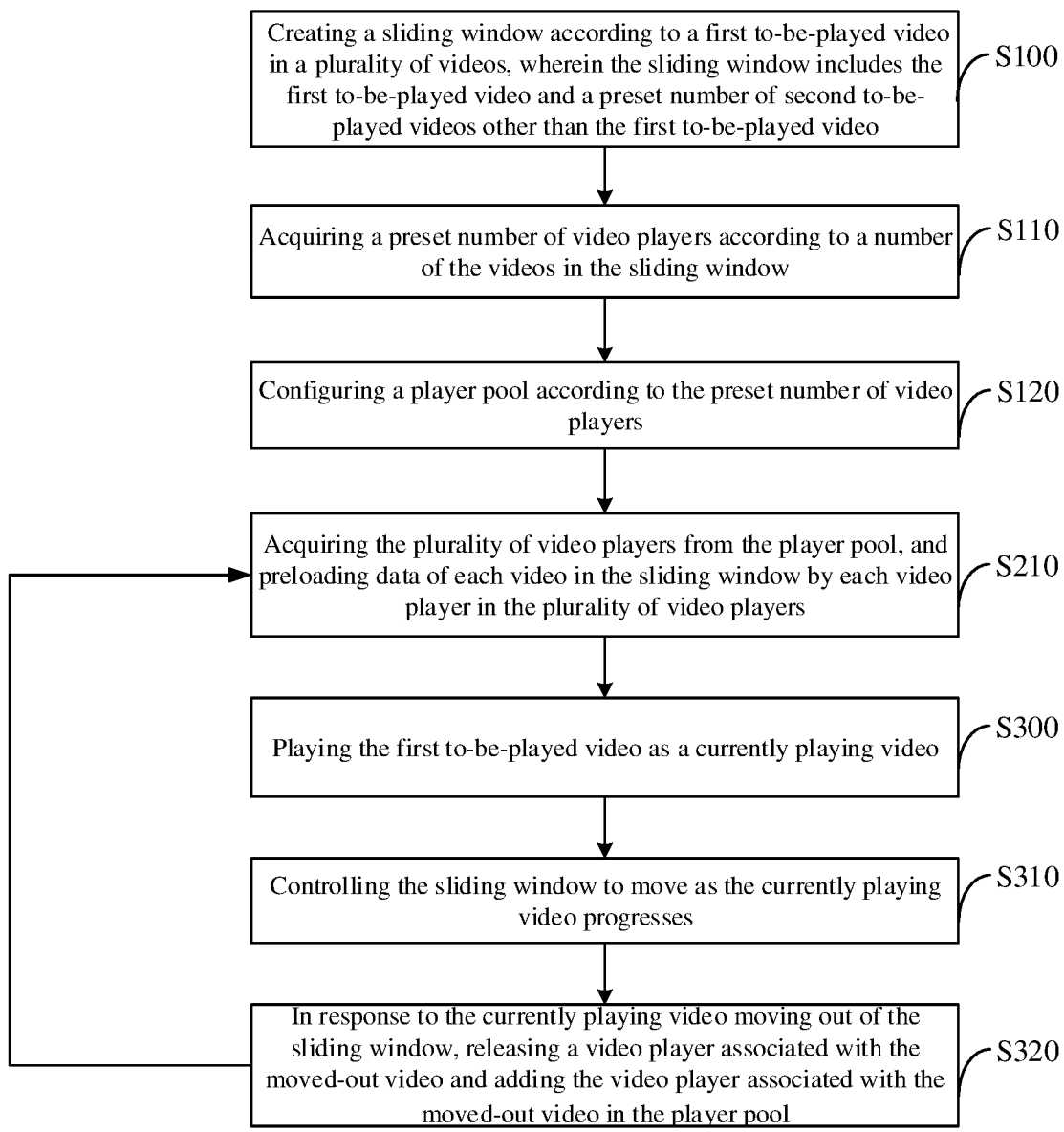
FIG. 3 is a flowchart showing yet another method for playing a plurality of videos according to an exemplary embodiment of the present disclosure.

In some embodiments, as shown in FIG. 2, prior to S200, the method further includes the following steps.

In S110, a preset number of video players are acquired according to the number of the videos in the sliding window.

In S120, a player pool is configured according to the preset number of video players.

S200 includes the following step.

In S210, a plurality of video players is acquired from the player pool, and data of each video in the sliding window is preloaded by each video player in the plurality of video players.

In this embodiment, the playing system may acquire the number of the videos contained in the sliding window, and set the preset number of video players according to the number of the videos. The preset number may be greater than or equal to that of the videos contained in the sliding window to ensure that enough video players may be acquired from the playing pool to preload each video in the sliding window. The playing system may configure the player pool according to the preset number of video players, i.e., the playing pool includes the preset number of video players. After that, the playing system may acquire a plurality of video players from the player pool, and preload each video in the sliding window by each video player in the plurality of video players.

In an implementation of this embodiment, after S300, the method further includes the following steps.

In S310, the sliding window is controlled to move as the currently playing video progresses.

In S320, when the video in the sliding window moves out of the sliding window, a video player associated with the moved-out video is released and added in the player pool.

In this implementation, the playing system may monitor the currently playing video in the playing window, and may control the sliding window to move as the currently playing video progresses. That is, the sliding window may dynamically change as the currently playing video progresses. With the movement of the sliding window, the video in the sliding window moves out of the sliding window. At this time, the playing system may release the video player associated with the moved-out video and add the video player in the player pool.

Further, after S310, the method further includes: preloading a third to-be-played video in the moved sliding window by a video player in the video pool. Specifically, as the sliding window moves, the first to-be-played video or the second to-be-played video in the sliding window moves out of the sliding window, and the third to-be-played video is simultaneously added to the sliding window. At this time, the playing system may acquire one video player from the player pool to preload the third to-be-played video. Specifically, the acquired video player may be adopted to preload the third to-be-played video to a designated position. The third to-be-played video is preloaded to the designated position without loading all the data of the third to-be-played video in the preloading stage, thereby reducing pressure of the playing system.

Therefore, in this embodiment, the video player corresponding to the moved-out video in the sliding window is released, and the released video player is added in the player pool, such that the playing system may acquire the video player from the player pool to preload the third to-be-played video. Thus, the video player in the player pool may be continuously reused to preload the videos in the sliding window, so as to reduce resources occupied by the system.

In some embodiments, the sliding window may include the currently playing video, a played video, and an unplayed video. The term "played" represents data or content that has been watched or played back. The term "unplayed" represents new data or content that has not be played back in their entireties, or represents new data or content for which playback has not begun for a particular user.

S400 includes: in response to a trigger operation of switching to playing a played video, the played video is treated as the second to-be-played video, calling a video player interface corresponding to the played video; and in response to a trigger operation of switching to playing a unplayed video, the unplayed video is treated as the second to-be-played video, calling a video player interface corresponding to the unplayed video and playing the unplayed video.

In this embodiment, after the sliding window is controlled to move as the currently playing video progresses, the sliding window may include three types of videos, namely the currently playing video, the played video and the unplayed video. At this time, upon receiving the user's triggering operation of switching the currently playing video to the played video, the playing system may call the video player interface corresponding to the played video according to the received operation, and play the played video through the video player interface. Upon receiving the user's triggering operation of switching the currently playing video to the unplayed video, the playing system may call the video player interface corresponding to the unplayed video according to the received operation, and play the unplayed video through the video player interface. The user's triggering operation may be the drag-to-play operation or the operation of triggering the playing progress bar to skip. When the user drags the playing progress bar, it is possible to return from the currently playing video to the video before the currently playing video in the playlist or skip directly to the video next to the currently playing video in the playlist.

It should be noted that in the present embodiment, because the dragging amplitude of the user may be small or large, and a clicking position where the user clicks the playing progress bar for playing may be closer to or farther from a corresponding position of the currently playing video on the playing progress bar. Therefore, upon detecting the user's triggering operation, the playing system may determine a video that is currently switched to according to specific conditions of the triggering operation. In this way, the played video in the present embodiment may be any video that has been played prior to the currently playing video in the playlist, and the unplayed video may be any video that has not been played after the currently playing video in the playlist.

In order to further explain the method for playing the plurality of videos as provided by any of the above embodiments, a specific embodiment is given below to explain the method for playing the plurality of videos in detail.

Figure 4:
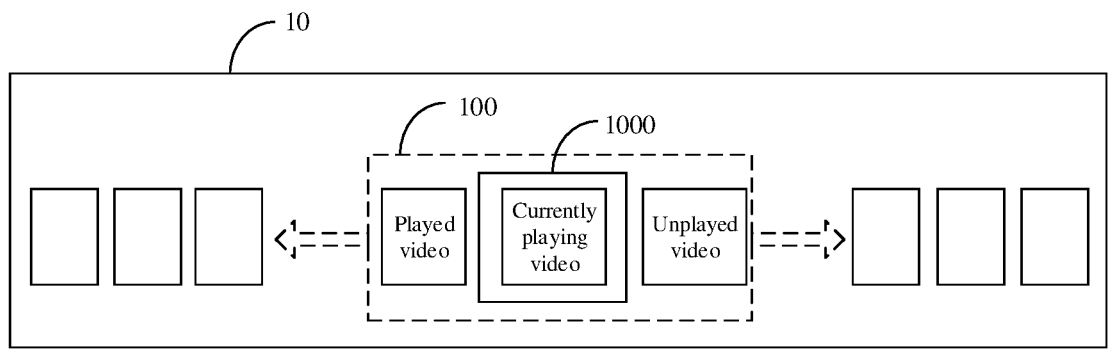
FIG. 4 is a schematic structural diagram of a sliding window according to an exemplary embodiment of the present disclosure.

The sliding window in the present disclosure is explained first. In the present disclosure, the sliding window is designed as shown in FIG. 4 below. There are 9 videos to be played in a playlist 10, and a sliding window 100 with a length of 3 (when the total number of the videos is less than 3, the size of the window is the number of the videos) is created. As shown in the dotted lines, the sliding window 100 includes 3 videos, namely a played video, a currently playing video and an unplayed video. The currently playing video is played in a playing window 1000. Three AVPlayers (the number is the same as that of the videos in the sliding window 100) form a player pool. Meanwhile, the videos in the sliding window are preloaded by the AVPlayers in the player pool, and the sliding window is moved with the playing of the currently playing video. Assuming that the playing system plays the videos normally, when the currently playing video is finished, the playing system may release the video player corresponding to the currently playing video and start to play the preloaded next video. In this way, the videos in the sliding window may be preloaded or played by continuously reusing the AVPlayer in the player pool, such that the multiple videos may be seamlessly switched for playing. The size of the sliding window 100 is set by mainly considering two cases, one is that the next video needs to be played seamlessly when the multiple videos are continuously played, and the other is that when the user drags the playing progress bar, it is possible to return from the currently playing video to the video before the currently playing video in the playlist. Therefore, the length of the sliding window 100 may be set to 3, i.e., 3 videos may be included in the sliding window. In some embodiments of the present disclosure, the sliding window is created with a preset length.

Figure 5:
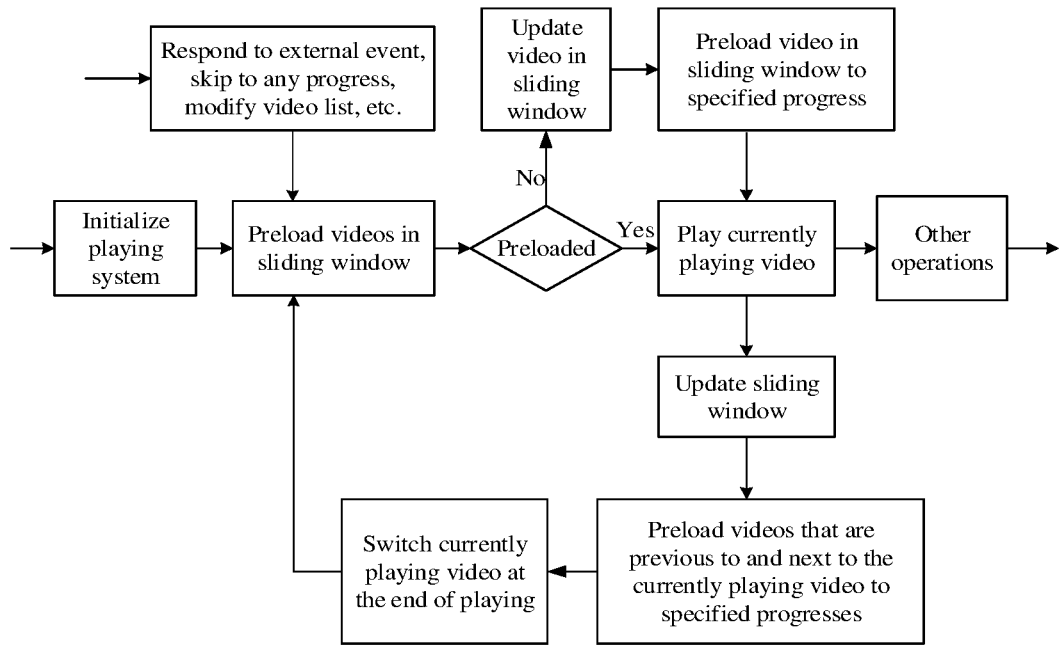
FIG. 5 is a flowchart showing playing control according to an exemplary embodiment of the present disclosure.

Next, a seamless switching control logic and a preloading strategy solution of the video player are explained. During initialization of the video playing system, a playing window may be created by taking the first to-be-played video as the first to-be-played video, a sliding window is preset according to the first to-be-played video, video players are assigned to the videos in the sliding window, and the videos in the sliding window are preloaded to designated positions. When the playing window plays the videos normally, plays by dragging or plays by clicking the playing progress bar to skip for playing, the playing system may always modify the sliding window with reference to the currently playing video. When it is necessary to switch the currently playing video, the screen (CAPlayerLayer) of the AVPlayer corresponding to the preloaded second to-be-played video is displayed, which achieves seamless switching, and then the sliding window is modified, and other videos in the sliding window are preloaded while the video is started. The process is described in the flowchart shown in FIG. 5.

In an exemplary embodiment, taking sequential playing as an example, the method may be specifically implemented as below: assuming that the videos in the sliding window are respectively a played video a, a currently playing video b and an unplayed video c in sequence, and the video after the video c in the playlist is a video d, the overall control logic is described as below.

(1) When the video b currently starts to play, the next video c is preloaded to a designated position.

(2) When the video b is finished, the screen in the playing window stays at the last frame of the video b, and the sliding window moves backward to play the preloaded video c. At this time, the video a moves out of the sliding window.

(3) With reference to step (1), the video c starts to play, the AVPlayer associated with video a is released into the player pool, an idle AVPlayer in the player pool is adopted to preload the video d to a designated position, and a circulation is made with reference to steps (1) and (2).

In addition to the above, the method further includes dragging the playing progress bar to skip for playing seamlessly and clicking to skip to a designated video for switching seamlessly. In an actual application scenario, in view of variability of a to-be-played video, such as video inserting or deleting, in order to fully guarantee the reliability of the solution, the playing system may check the videos in the playlist, the videos included in the sliding window and preloading of each video in the sliding window, so as to ensure normal execution of services.

Therefore, the above method for playing the plurality of videos effectively realizes seamless playing of the multiple videos, including seamless playing normally, seamless playing by dragging, seamless playing by clicking for progress switching, etc. Simple video editing effects may also be seamlessly previewed, such as speed, rotation, cutting, etc. of specified videos. In addition, the present disclosure may realize seamless preview of the plurality of videos in real time without secondary encoding of the videos, and may support all IOS equipment.

In summary, in the embodiments of the present disclosure, the sliding window is created according to the first to-be-played video in the plurality of videos, and the sliding window includes the preset number of second to-be-played videos in addition to the first to-be-played video. According to the method, the first to-be-played video is played as the currently playing video, and the plurality of video players is adopted to preload the currently playing video and the preset number of second to-be-played videos. When the currently playing video is finished and is immediately switched to the next video for playing and displaying, the video player interface corresponding to the second to-be-played video that is switched to in the sliding window is called, and then the second to-be-played video that is switched to is played, realizing seamless switching between the plurality of videos that are switched for playing. Therefore, splicing preview of the plurality of videos can be realized in real time without secondary encoding of the videos and without adaptive configuration for the video, and the expandability is better.

The present disclosure further provides a storage medium storing a computer program therein. The computer program, when run by a processor, causes the processor to implement the method for playing the plurality of videos as defined in any of the embodiments described above. The storage medium may be a memory, which is, for example, an internal memory or an external memory, or both an internal memory and an external memory. The internal memory may include a read-only memory (ROM), a programmable ROM (PROM), an electrical PROM (EPROM), an electrically erasable PROM (EEPROM), a flash memory or a random-access memory (RAM). The external memory may include a hard disk, a floppy disk, a ZIP disk, a USB flash disk, a magnetic tape, etc. The storage medium disclosed by the present disclosure includes but is not limited to these types of memories. The memory disclosed by the present disclosure is taken as only an example but not a limitation.

The present disclosure further provides a computer device. The computer device includes at least one processor, a memory and at least one application. The at least one application, when run by the at least one processor, causes the at least one processor to perform the method for playing the plurality of videos as defined in any of the embodiments described above.

Figure 6:
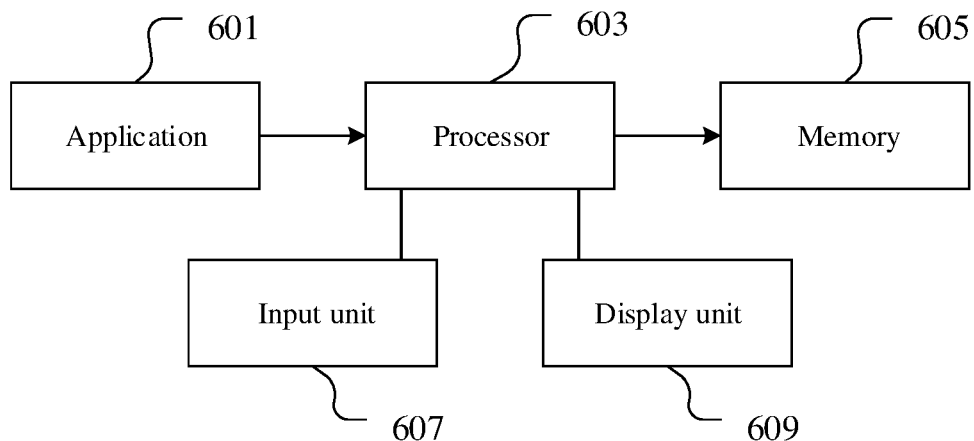
FIG. 6 is a schematic structural diagram of a computer device according to an exemplary embodiment of the present disclosure.

Referring to FIG. 6, a schematic structural diagram of a computer device according to an embodiment of the present disclosure is shown. The computer device may be a server, a personal computer and a network device. As shown in FIG. 6, the computer device includes a processor 603, a memory 605, an input unit 607, a display unit 609, etc. It will be understood by those skilled in the art that the device structure shown in FIG. 6 does not constitute a limitation to all devices, and may include more or less components than those illustrated, or a combination of some components. The memory 605 may be configured to store an application 601 and all functional modules. The processor 603 runs various function applications and data processing of the device by running the application 601 stored in the memory 605. The memory may be an internal memory or an external memory, or includes both an internal memory and an external memory. The internal memory may include a ROM, a PROM, an EPROM, an EEPROM, a flash memory or a RAM. The external memory may include a hard disk, a floppy disk, a ZIP disk, a USB flash disk, a magnetic tape, etc. The memory disclosed by the present disclosure includes but is not limited to these types of memories. The memory disclosed by the present disclosure is taken as only an example but not a limitation.

The input unit 607 may be configured to receive input of signals and keywords input by users. The input unit 607 may include a touch panel and other input devices. The touch panel can collect touch operations (e.g., operations on or near the touch panel by the users with any appropriate object or accessory like a finger, a touch pen or the like) on or near the touch panel by the users and can also drive a corresponding linkage device based on a preset program. The other input devices may include but not limited to one or more of a physical keyboard, function keys (such as a play control key and a switch key), a trackball, a mouse, a manipulator, etc. The display unit 609 may be configured to display information input by the users or information provided to the users as well as various menus of the computer device. The display unit 609 may be configured in the form of a liquid crystal display (LCD), an organic light-emitting diode (OLED), or the like. The processor 603 is a control center of the computer device and links all portions of an entire computer by various interfaces and circuits. By running or executing the software programs and/or the modules stored in the memory 605 and calling data stored in the memory, the processor executes various functions and data processing.

In some embodiments, the device includes at least one processor 603, at least one memory 605 and at least one application 601. The at least one application 601 is stored in the memory 605. The at least one application, when run by the at least one processor 603, causes the at least one processor 603 to perform the method for playing the plurality of videos as defined in any of the embodiments described above.

In addition, all functional units in the embodiments of the present disclosure may be integrated into one processing module. Or, each unit exists physically independently. Or, two or more units may be integrated into one module. The above integrated modules may be implemented in the form of hardware or a software functional module. The integrated modules, if implemented in the form of the software functional module and sold or used as an independent product, can be stored in a computer-readable storage medium.

The serial numbers of the embodiments of the present disclosure are merely for description, and do not represent the priority of the embodiments.

Those of ordinary skills in the art can understand that all or part of the steps described in the above embodiments can be completed through hardware, or through relevant hardware instructed by applications stored in a computer-readable storage medium, such as a read-only memory, a disk or a CD, etc.

Described above are merely preferred embodiments of the present disclosure, but are not intended to limit the present disclosure. Any modifications, equivalent replacements, improvements and the like made within the spirit and principles of the present disclosure should be included within the scope of protection of the present disclosure.

What is claimed is:

1. A method for playing a plurality of videos, comprising:
    creating a sliding window with a preset length according to a first to-be-played video in the plurality of videos, wherein the sliding window comprises at least a played video, the first to-be-played video and a second to-be-played video, the first to-be-played video is a currently playing video and the second to-be-played video is an unplayed video;
    acquiring a preset number of video players according to a number of videos in the sliding window, wherein the preset number of video players is greater than or equal to the number of videos in the sliding window;
    configuring a player pool according to the preset number of video players;
    acquiring the video players from the player pool;
    preloading the first to-be-played video by one of the video players and playing the first to-be-played video as the currently playing video, and simultaneously preloading the second to-be-played video by other video players while the first to-be-played video is playing;
    playing the second to-be-played video by calling a video player interface corresponding to the second to-be-played video in the sliding window in response to the currently playing video being switched to the second to-be-played video, wherein the sliding window moves as the currently playing video progresses, so as to position a next video in the sliding window and preload the next video as a new second to-be-played video;
    controlling the sliding window to move as the currently playing video progresses; and
    in response to the currently playing video moving out of the sliding window, releasing a video player associated with the moved out video and adding the video player associated with the moved out video in the player pool to make the added video player available for preloading such that the video players in the pool are continuously reused to preload the videos in the sliding window.

2. The method according to claim 1, wherein upon controlling the sliding window to move as the currently playing video progresses, the method further comprises:
    preloading a third to-be-played video in the moved sliding window by the video player.

3. The method according to claim 2, wherein preloading the third to-be-played video in the moved sliding window by the video player comprises:
    preloading the third to-be-played video to a designated position by the video player.

4. The method according to claim 1, wherein
    playing the second to-be-played video by calling a video player interface corresponding to the second to-be-played video in the sliding window in response to the currently playing video being switched to the second to-be-played video comprises:
    playing the played video as the second to-be-played video by calling a video player interface corresponding to the played video in response to a trigger operation of switching to playing the played video; and
    playing the unplayed video as the second to-be-played video by calling a video player interface corresponding to the unplayed video in response to a trigger operation of switching to playing the unplayed video.

5. The method according to claim 1, wherein calling the video player interface corresponding to the second to-be-played video in the sliding window in response to the currently playing video being switched to the second to-be-played video comprises:
    calling the video player interface corresponding to the second to-be-played video in the sliding window and switching a screen of a video player corresponding to the second to-be-played video for display in response to the currently playing video being switched to the second to-be-played video.

6. The method according to claim 1, wherein upon playing the first to-be-played video as the currently playing video, the method further comprises:
modifying the sliding window according to playing of the currently playing video; or
modifying the sliding window in response to receiving a drag-to-play operation or an operation of triggering a playing progress bar to skip.

7. The method according to claim 1, wherein the first to-be-played video and the second to-be played video are preloaded to designated positions of corresponding videos.

8. A non-volatile storage medium storing a computer program therein, wherein the computer program, when run by a processor, causes the processor to perform a method for playing a plurality of videos comprising:
creating a sliding window with a preset length according to a first to-be-played video in the plurality of videos, wherein the sliding window comprises at least a played video, first to-be-played video, a second to-be-played video, the first to-be-played video is a currently playing video and the second to-be-played video is an unplayed video;
acquiring a preset number of video players according to a number of videos in the sliding window, wherein the preset number of video players is greater than or equal to the number of videos in the sliding window;
configuring a player pool according to the preset number of video players;
acquiring the video players from the player pool;
preloading the first to-be-played video by one of the video players and playing the first to-be-played video as the currently playing video, and simultaneously preloading the second to-be-played video by other video players while the first to-be-played video is playing;
playing the second to-be-played video by calling a video player interface corresponding to the second to-be-played video in the sliding window in response to the currently playing video being switched to the second to-be-played video, wherein the sliding window moves as the currently playing video progresses, so as to position a next video in the sliding window and preload the next video as a new second to-be-played video;
controlling the sliding window to move as the currently playing video progresses; and
in response to the currently playing video moving out of the sliding window, releasing a video player associated with the moved out video and adding the video player associated with the moved out video in the player pool to make the added video player available for preloading such that the video players in the pool are continuously reused to preload the videos in the sliding window.

9. The non-volatile storage medium according to claim 8, wherein upon controlling the sliding window to move as the currently playing video progresses, the method further comprises:
preloading a third to-be-played video in the moved sliding window by the video player.

10. A computer device, comprising:
at least one processor;
a memory; and
at least one application stored in the memory, wherein the at least one application, when run by the at least one processor, causes the at least one processor to perform a method for playing a plurality of videos comprising:
creating a sliding window with a preset length according to a first to-be-played video in the plurality of videos, wherein the sliding window comprises at least a played video, the first to-be-played video and a second to-be-played video, the first to-be-played video is a currently playing video and the second to-be-played video is an unplayed video;
acquiring a preset number of video players according to a number of videos in the sliding window, wherein the preset number of video players is greater than or equal to the number of videos in the sliding window;
configuring a player pool according to the preset number of video players;
acquiring the video players from the player pool;
preloading the first to-be-played video by one of the video players and playing the first to-be-played video as a currently playing video, and simultaneously preloading the second to-be-played video by other video players while the first to-be-played video is playing; and
playing the second to-be-played video by calling a video player interface corresponding to the second to-be-played video in the sliding window in response to the currently playing video being switched to the second to-be-played video, wherein the sliding window moves as the currently playing video progresses, so as to position a next video in the sliding window and preload the next video as a new second to-be-played video;
controlling the sliding window to move as the currently playing video progresses; and
in response to the currently playing video moving out of the sliding window, releasing a video player associated with the moved out video and adding the video player associated with the moved out video in the player pool to make the added video player available for preloading such that the video players in the pool are continuously reused to preload the videos in the sliding window.

11. The computer device according to claim 10, wherein upon controlling the sliding window to move as the currently playing video progresses, the method further comprises:
preloading a third to-be-played video in the moved sliding window by the video player.

12. The computer device according to claim 11, wherein preloading the third to-be-played video in the moved sliding window by the video player comprises:
preloading the third to-be-played video to a designated position by the video player.

13. The computer device according to claim 10, wherein playing the second to-be-played video by calling a video player interface corresponding to the second to-be-played video in the sliding window in response to the currently playing video being switched to the second to-be-played video comprises:
playing the played video as the second to-be-played video by calling a video player interface corresponding to the played video in response to a trigger operation of switching to playing the played video; and
playing the unplayed video as the second to-be-played video by calling a video player interface corresponding to the unplayed video in response to a trigger operation of switching to playing the unplayed video.

14. The computer device according to claim 10, wherein calling the video player interface corresponding to the second to-be-played video in the sliding window in response to the currently playing video being switched to the second to-be-played video comprises:
calling the video player interface corresponding to the second to-be-played video in the sliding window and switching a screen of a video player corresponding to the second to-be-played video for display in response to the currently playing video being switched to the second to-be-played video.

15. The computer device according to claim 10, wherein upon playing the first to-be-played video as the currently playing video, the method further comprises:
  modifying the sliding window according to playing of the currently playing video; or
  modifying the sliding window in response to receiving a drag-to-play operation or an operation of triggering a playing progress bar to skip.

* * * * *